July 5, 1938.　　　　　A. RAPPL　　　　　2,122,802
WINDSHIELD CLEANER ARM
Filed March 25, 1935
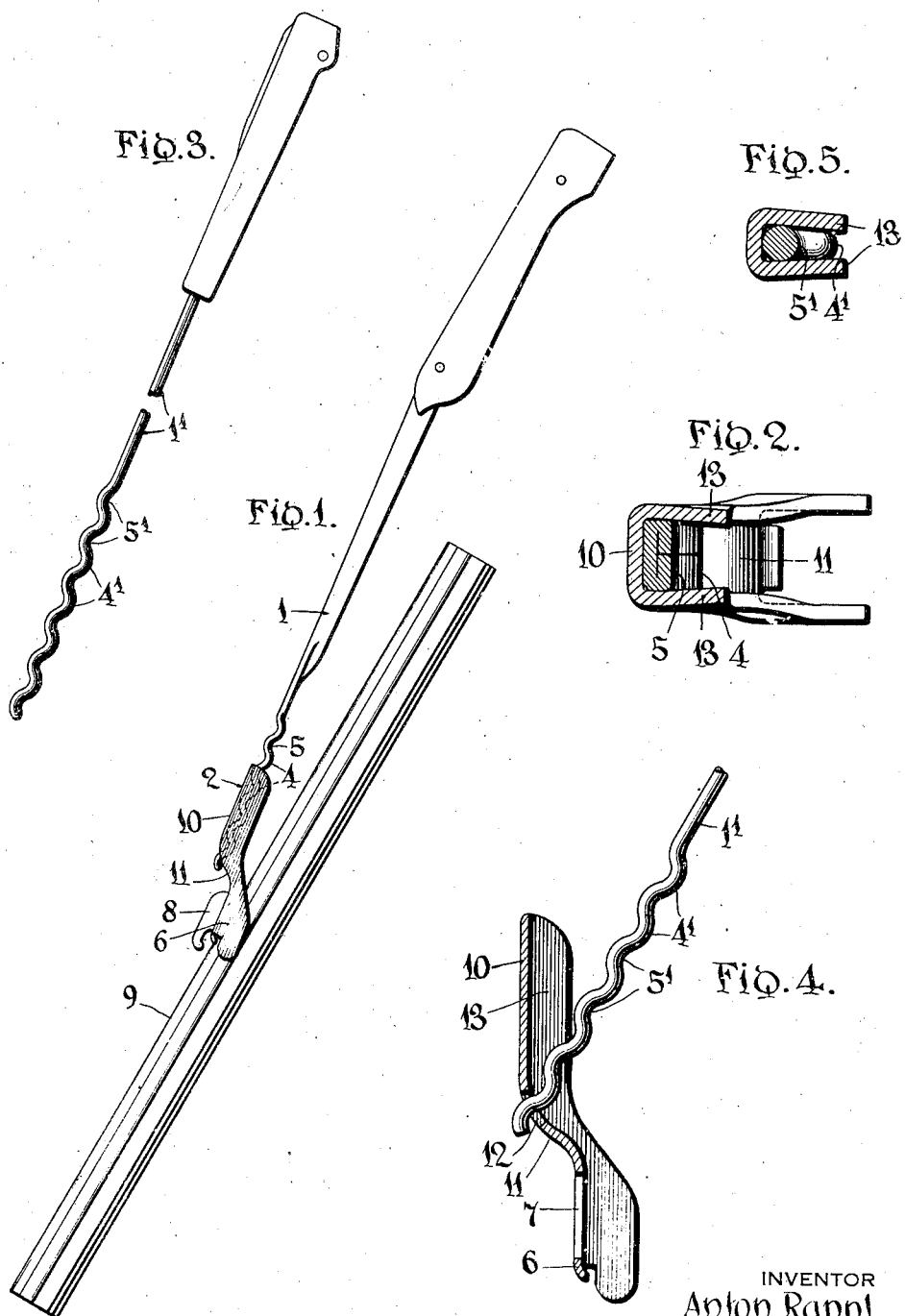
INVENTOR
Anton Rappl,
BY
Bean & Brooks
ATTORNEYS Patented July 5, 1938

2,122,802

UNITED STATES PATENT OFFICE 2,122,802

WINDSHIELD CLEANER ARM

Anton Rappl, Buffalo, N. Y., assignor to Trico Products Corporation, Buffalo, N. Y., a corporation Application March 25, 1935, Serial No. 12,929

11 Claims. (Cl. 15—250)

This invention relates to a windshield cleaner and particularly to the wiper carrying arm.

Windshield cleaners which are now in use have their wiper carrying arm of a definite length and it is frequently necessary to modify the length of the arm or use a shorter blade in order to adapt the cleaner for the particular installation. Adjustable arms have heretofore been proposed, wherein the plural arm sections are secured together through hook and eye connections, one section of the arm being provided with a longitudinal series of eyes or openings in which the companion section may be selectively hooked for obtaining the desired length of the wiper arm. Such a construction is disclosed in Letters Patent, No. 1,920,145 granted July 25, 1933, to Henry Hueber for improvements in a wiper arm and mounting therefor.

The present invention has for its object to provide an adjustable wiper arm which is practical in design, easily manufactured and efficient in the performance of its function, and further, one wherein a given or set adjustment is secured in a simple manner.

In the drawing, Fig. 1 is a side elevation of a wiper and its carrying arm in assembled relation, disclosing one embodiment of the present invention.

Fig. 2 is a transverse sectional view through the adjustably connected sections of the arm.

Fig. 3 is a side elevation of a slightly modified arm.

Fig. 4 is a fragmentary view depicting the manner of connecting the arm sections together, and Fig. 5 is a view similar to Fig. 2 but being a cross section through the arm parts of Fig. 4 when in fully assembled relation.

Referring more particularly to the drawing, the wiper carrying arm 1 has its outer blade supporting end under a resilient urge to press the wiper blade yieldingly against the windshield glass in the usual well known manner to thereby obtain the desired wiping contact with the glass. The arm shank may be formed of sheet metal and have its outer or free end portion flattened, as in Figs. 1 and 2, to more readily receive a serpentine shape for providing a series of shoulders 4 and recesses 5. Or, the arm shank may be formed of a stiff wire, as at 1' in Fig. 3, and provided with a series of shoulders 4' and recesses 5', thereby designing a hill and dale formation in a plane substantially normal to the windshield surface.

The adjustable arm section 2 is preferably struck up from sheet metal and has a blade attaching part 6 and a rearwardly extending locking portion 10 which is connected to the blade attaching part by a transverse wall or off-set 11. The attaching part 6 is designed for attachment to the wiper blade 9 in a suitable manner, such as by the slot 7 in the part 6 to receive the attaching fin 8 on the blade. Adjacent the juncture of the off-set 11 and the part 10, there is located an opening 12 through which the serpentine portion of the arm is threaded until the desired composite arm length is obtained, whereupon the locking portion 10 is swung downwardly against the arm shank, from the position shown in Fig. 4 to that shown in Figs. 1, 2 and 5, where it is secured by the opposed side flanges 13 that snugly and resiliently embrace the interposed arm shank portion. When the locking portion has been folded down over the arm shank, the off-set 11 is made to seat in a selected one of the recesses 5 (5') where it is secured against unauthorized longitudinal displacement on the arm shank. This securement against longitudinal displacement is insured by the off-set 11 and by the confining shoulders 4 (4') above and below the same. The adjusted relationship of the arm sections is maintained by the frictional clamping of the flanges 13 over the serpentine or shank portion, as shown somewhat exaggerated in Figs. 2 and 5.

By reason of the present construction, the desired length of the arm may be readily obtained by an adjustment which is practical and durable and which is secured against accidental loss of the adjustable section. With the adjustment afforded by this arm, the cleaner may readily be adapted for use with varying lengths of wipers, and should the serpentine end of the shank be extended outwardly over the blade attaching part 6, no interference will be had with the efficient operation of the wiper.

What is claimed is:

1. An adjustable wiper carrying arm having one section formed with a series of hill and dale formations at one end portion thereof in a plane substantially normal to the window surface, and a companion section bodily swingable into and out of interlocking engagement with the first section, said companion section having a rigid locking part integral therewith and engageable with the hill and dale formation of the first section.

2. An adjustable wiper arm having one section provided with a serpentine portion at one end portion thereof, a second section bodily swingable thereover and having a part selectively interlockable with a part of the serpentine portion, and means on the second section for securing such interlocking engagement.

3. An adjustable wiper arm having one section provided with a serpentine portion, a second section secured thereto for adjustment, said second section having a blade attaching part and arm embracing part, said parts being joined by an offsetting portion, said offsetting portion having a part interlockably engageable with said serpentine portion at a selected point.

4. An adjustable wiper arm having one section provided with a shank having a longitudinal series of shoulders, a second section having a blade attaching part and a shank embracing part, said second section being provided with an opening between said blade attaching part and said embracing part for receiving the shank, the edge of the opening being selectively engaged with said shoulders.

5. A wiper arm having two adjustably connected sections, one section having a shank provided with a longitudinal series of shoulders, the companion section having a blade attaching part and a shank engaging part said companion section having a shank receiving opening with the edge thereof engageable with a selected shoulder of the shank upon relative pivotal movement between the sections, said shank engaging part having a portion foldable on to the shank and engaging the same to hold the two sections against relative pivotal movement to thereby secure the edge engaged with the selected shoulder.

6. A wiper arm having two adjustably connected sections, one section having a shank provided with a longitudinal series of shoulders, the companion section having a blade attaching part and a shank engaging part with a shank receiving opening between said parts, said companion section having a part selectively interengageable with the shoulders by and during relative movement between the two sections, and means for securing said companion section folded against the shank.

7. An adjustable wiper arm having one section provided with a serpentine portion, a second section secured thereto for adjustment, said second section adapted for attachment to a wiper and having an arm embracing part with an adjacent offset portion, said offset portion having a part interlockable with said serpentine portion at a selected point by and during relative movement between the sections.

8. A wiper attaching section for an adjustable arm in which a shank is provided with a longitudinal series of shoulders, comprising a sheet metal member of channeled formation offset intermediate its ends so that the opposite end portions thereof lie in different planes, the intermediate offsetting portion having a part adapted for selective interlock with one of the shoulders and one end portion being provided with wiper attaching means while the opposite end portion is formed to detachably fasten itself to the shank of the wiper arm for securing the interlock.

9. A wiper attaching section for an adjustable arm, comprising a sheet metal member of channeled formation offset intermediate its ends so that the opposite end portions thereof lie in different planes, one end portion being provided with wiper attaching means and the opposite end portion being formed for detachable embrace with a companion section of the wiper arm to secure such opposite end portion to the latter, said sheet metal member being provided with an opening in the intermediate offsetting portion to receive such companion arm section and having a part interlockable with a shoulder on the companion section.

10. An adjustable section for a wiper arm, comprising a sheet metal member of channeled formation offset intermediate its ends whereby the opposite end portions lie in different planes, one end portion being provided with an opening to receive an attaching part of a wiper blade, said member having an opening in its opposite end portion adjacent the offset through which a companion section of the wiper arm may extend to overlie the opening of said end portion, and means for detachably interlocking with the companion section to secure the channeled member thereto.

11. An adjustable wiper arm for windshield cleaners, comprising a section having a shank formed with a shoulder, a second section having a blade attaching part and a shank embracing part, the two parts being integrally joined by an offsetting portion having an opening therethrough to receive the shank of the first section, the second section having a transverse edge engageable with the shoulder to secure the two sections against relative longitudinal movement, and said shank embracing part being of channeled formation with the sides of the channel resiliently embracing the shank to frictionally and detachably hold the transverse edge engaged with said shoulder.

ANTON RAPPL.